(12) United States Patent
Lilja et al.

(10) Patent No.: US 12,098,447 B2
(45) Date of Patent: Sep. 24, 2024

(54) ROCK DRILL INSERT (71) Applicant: SANDVIK MINING AND CONSTRUCTION TOOLS AB, Sandviken (SE)

(72) Inventors: Mirjam Lilja, Farsta (SE); Jose Maria Tarrago Cifre, Barcelona (ES); Ida Borgh, Stockholm (SE); Malin Martensson, Nacka (SE); Ioannis Arvanitidis, Stockholm (SE); Krystof Turba, Bandhagen (SE)

(73) Assignee: Sandvik Mining and Construction Tools AB, Sandviken (SE)

( * ) Notice: Subject to any disclaimer, the term of this patent is extended or adjusted under 35 U.S.C. 154(b) by 67 days.

(21) Appl. No.: 17/041,014

(22) PCT Filed: Mar. 22, 2019

(86) PCT No.: PCT/EP2019/057265
§ 371 (c)(1),
(2) Date: Sep. 24, 2020

(87) PCT Pub. No.: WO2019/185481
PCT Pub. Date: Oct. 3, 2019

(65) Prior Publication Data
US 2021/0140019 A1     May 13, 2021

(30) Foreign Application Priority Data
Mar. 27, 2018 (EP) .................................. 18164215

(51) Int. Cl.
*C22C 29/08* (2006.01)
*B22F 3/15* (2006.01)
(Continued)

(52) U.S. Cl.
CPC ............ *C22C 29/08* (2013.01); *C22C 29/005* (2013.01); *B22F 3/15* (2013.01); *B22F 2005/001* (2013.01);
(Continued)

(58) Field of Classification Search
CPC ......... C22C 29/005; C22C 29/08; B22F 3/15; B22F 9/04; B22F 2005/001; B22F 2009/043; B22F 2301/15; B22F 2302/10
See application file for complete search history.

(56) References Cited

U.S. PATENT DOCUMENTS 3,149,411 A * 9/1964 Wilder .................. C22C 29/067
75/238
4,963,183 A * 10/1990 Hong ...................... C22C 29/08
75/241
(Continued)

FOREIGN PATENT DOCUMENTS

| CL | 42766 | 5/2006 |
|---|---|---|
| CL | 201702412 | 9/2017 |

(Continued)

OTHER PUBLICATIONS

Banerjee et al:"Effect of Binder-Phase Modification and CR3C2 Addition on Properties of WC-10C0 Cemented Carbide", Journal of Materials Engineering and Performance, ASM International, Materials Park, Oh, US. vol. 4, No. 5, Oct. 1, 1995.
(Continued)

*Primary Examiner* — Pegah Parvini
(74) *Attorney, Agent, or Firm* — Corinne R. Gorski (57) ABSTRACT

A rock drill insert made of cemented carbide includes hard constituents of tungsten carbide (WC) in a binder phase of Ni—Cr, or Ni—Co—Cr, and a balance of WC and unavoidable impurities. The cemented carbide has a 3.5-18 wt % binder phase. The binder phase has >0 wt % Ni. The mass
(Continued)

ratio Cr/(Ni+Co) is 0.02-0.19. A difference between the hardness at 0.3 mm depth at some point of the surface of the rock drill insert and the minimum hardness of the bulk of the rock drill insert is at least 30 HV3.

13 Claims, 5 Drawing Sheets

(51) Int. Cl.
 *B22F 5/00* (2006.01)
 *B22F 9/04* (2006.01)
 *C22C 29/00* (2006.01)

(52) U.S. Cl.
 CPC ........... *B22F 9/04* (2013.01); *B22F 2009/043* (2013.01); *B22F 2301/15* (2013.01); *B22F 2302/10* (2013.01)

(56) References Cited

U.S. PATENT DOCUMENTS

| | | |
|---|---|---|
| 5,305,840 A | 4/1994 | Liang et al. |
| 5,663,512 A | 9/1997 | Schader et al. |
| 7,490,502 B2 | 2/2009 | Pauty et al. |
| 2007/0110607 A1 | 5/2007 | Iwasaki et al. |
| 2012/0247028 A1 | 10/2012 | Konyashin et al. |
| 2018/0073108 A1 | 3/2018 | Nordgren et al. |

FOREIGN PATENT DOCUMENTS

| | | | |
|---|---|---|---|
| CN | 101263236 A | 9/2008 | |
| CN | 101745933 A | 6/2010 | |
| EP | 0257869 A | 3/1988 | |
| EP | 1548136 A1 | 6/2005 | |
| EP | 1697551 A1 | 9/2006 | |
| ES | 2613643 T3 | 5/2017 | |
| JP | 2008069420 A | 3/2008 | |
| JP | 2015107525 A | 6/2015 | |
| RU | 2071869 C2 | 1/1997 | |
| RU | 2467085 C2 | 11/2012 | |
| RU | 2526627 C2 | 8/2014 | |
| WO | 9913119 A1 | 3/1999 | |
| WO | 2012130851 A1 | 10/2012 | |
| WO | WO-2013135555 A1 * | 9/2013 | ............... B22F 3/24 |
| WO | 2014191511 A1 | 12/2014 | |
| WO | 2018060125 A1 | 4/2018 | |

OTHER PUBLICATIONS

Aristizabal et al: "Comparison of the friction and wear behavior of WCNiCoCr and WCCo hardmetals in contact with steel at high temperatures", Wear, Elsevier Sequoia, Lausanne, Ch, vol. 280, Jan. 4, 2012, pp. 15-21.

* cited by examiner

ROCK DRILL INSERT

RELATED APPLICATION DATA

This application is a § 371 National Stage Application of PCT International Application No. PCT/EP2019/057265 filed Mar. 22, 2019 claiming priority to EP 18164215.8 filed Mar. 27, 2018.

TECHNICAL FIELD

The present invention relates to a rock drill insert comprising a body made of a WC—Ni—Cr or WC—Ni—Co—Cr based cemented carbide wherein there is a significant hardness gradient near the surface of the cemented carbide body.

BACKGROUND OF THE INVENTION

Rock drilling is a technical area in which the inserts which are used for the purpose of drilling in the rock are subjected to both severe corrosive conditions and repeated impacts due to the inherent nature of the drilling. Different drilling techniques will result in different impact loads on the inserts. Particularly severe impact conditions are found in applications such as those in which the rock drill inserts are mounted in a rock drill bit body of a top-hammer (TH) device, a down-the-hole (DTH) drilling device or a rotary drilling device.

Traditionally, rock drill inserts may consist of a body made of cemented carbide that comprises hard constituents of tungsten carbide (WC) in a binder phase of cobalt (Co). However, there are reasons for providing an alternative binder phase which could reduce the use of cobalt or even completely be cobalt-free. The reasons are both the risk of shortage of cobalt supply on the market due to increasing use in other technical areas such as vehicle batteries and also health concerns when handling cobalt powder in cemented carbide production.

The present invention arises from investigations of the effects of additions of chromium to the further components forming the cemented carbide, before the compaction and sintering of the compact. Thus, the cemented carbide of the rock drill insert contains chromium in its binder phase.

THE OBJECT OF THE INVENTION

It is an object of the present invention to present a rock drill insert which is improved in comparison to inserts of prior art of cemented carbide in the sense that they have an improved corrosion resistance which reduces the wear in wet drilling conditions. Still the cemented carbide must have an acceptable hardness and ductility to withstand the repeated impact load that it will be subjected to during use. In other words, it must not be too brittle. Furthermore, it is an object to present a rock drill insert with both an increased wear resistance and an increased impact toughness reducing early damage and bending load failures. Furthermore, it is an object to present a rock drill insert which has a binder phase in which cobalt has been partly or completely replaced with good technical performance in rock drilling.

Definitions

By the term "bulk" is herein meant the cemented carbide of the innermost part (centre) of the rock drill insert.

SUMMARY OF THE INVENTION

The object of the invention is achieved by means of a rock drill insert made of cemented carbide that comprises hard constituents of tungsten carbide (WC) in a binder phase of Ni—Cr, or Ni—Co—Cr, and balance WC and unavoidable impurities, wherein the cemented carbide comprises 3.5-18 wt % binder phase, the binder phase comprises >0 wt % Ni, the mass ratio Cr/(Ni+Co) is 0.02-0.19, the difference between the hardness at 0.3 mm depth at some point of the surface of the rock drill insert and the minimum hardness of the bulk of the rock drill insert is at least 30 HV3.

The rock drill insert of the present invention is produced by means of a process in which a powder comprising the elements of the cemented carbide is milled and compacted into a compact which is then sintered. A grinding step to obtain the precise dimension of the drill insert is generally made. A drill insert of the present invention generally has a cylindrical base part and a rounded top which may be hemispherical, conical or asymmetric. Typically, the curved surface of the cylindrical base part is grinded to obtain the precise diameter wanted, while the surfaces of the top part and the circular base part are kept in their as sintered state. The drill insert is then subjected to post-treatment which introduces high levels of compressive stresses in the insert, such as a special high-energy oscillating collision process.

The combined effects of compressive stress induction and binder hardening have surprisingly been discovered being particularly strong for chromium-containing inserts both during the pre-application treatment in the high-energy oscillation collision process and also during the drilling application itself. Thus, rock drill inserts based on a chromium-containing cemented carbide of the present invention will provide a stronger surface hardening during actual drilling than rock drill inserts of cemented carbide not containing chromium.

The result is reduced wear and increased resistance towards breakage of the insert during use thereof. Also, the addition of Cr results in an improvement of the corrosion resistance of the binder phase, which reduces the wear in wet drilling conditions.

If the mass ratio Cr/(Ni+Co) ratio is too low, the mentioned positive effects of Cr will be too small. If, on the other hand, the mass ratio Cr/(Ni+Co) ratio is too high, there will be a formation of chromium carbides in which the binder phase element nickel, or binder phase elements nickel and cobalt, is/are dissolved, whereby the amount of binder phase is significantly reduced and the cemented carbide becomes too brittle.

The WC grain size is chosen to suit the desired end properties of the cemented carbide in terms of, for example, thermal conductivity and non-brittleness of the cemented carbide. According to one embodiment the WC mean grain size is above 1 μm, or above 1.25 μm, or above 1.5 μm, or above 1.75 μm, or above 2.0 μm. If the WC grain size is too small. the material will be too hard and brittle for rock drilling. On the other hand if the WC grain size is too large, one drawback is that the material becomes difficult to sinter. Therefore, it is preferred that the WC mean grain size is less than 18 μm, or less than 15 μm, or less than 10 μm, or less than 5 μm. The WC mean grain size is determined with the method as described in the Examples section herein.

In one embodiment the cemented carbide comprises 3.5-15 wt % binder phase, or 4-12 wt % binder phase.

In one embodiment the binder phase of Ni—Co—Cr comprises >0 wt % Ni, or >25 wt % Ni, or >50 wt % Ni, or >75 wt % Ni.

In one embodiment the binder phase of Ni—Co—Cr comprises >0 wt % Ni, and >25 wt % Co, or >50 wt % Co, or >75 wt % Co.

In one embodiment the binder phase is a binder phase of Ni—Cr.

According to a preferred embodiment, the mass ratio Cr/(Ni+Co) is 0.04-0.19

According to a preferred embodiment, the mass ratio Cr/(Ni+Co) is 0.075-0.15

According to yet a preferred embodiment, the mass ratio Cr/(Ni+Co) is 0.085 to 0.15.

According to yet another preferred embodiment, the mass ratio Cr/(Ni+Co) is 0.085 to 0.12.

The rock drill insert of the present invention suitably contains Cr throughout the rock drill insert. The Cr/(Ni+Co) mass ratio defined herein is thus suitably substantially the same and present throughout the rock drill insert, including in the bulk.

When the binder phase is Ni—Cr, i.e., without any Co present, then the expression "mass ratio Cr/(Ni+Co)" used herein equals "mass ratio Cr/Ni".

Even though the Cr is to a great extent dissolved in the binder phase, some amount of undissolved chromium carbides, usually added as $Cr_3C_2$ in the production process, may remain in the cemented carbide. Up to 3 mass %, preferably up to 2 mass %, more preferably up to 1 mass %, chromium carbides (as added carbides, or $Cr_3C_2$) may be allowed in the cemented carbide. This means that in one embodiment the cemented carbide contains up to 3 mass %, preferably up to 2 mass %, more preferably up to 1 mass %, chromium carbides (as added carbides, or $Cr_3C_2$). If present, the mean grain size of the chromium carbides (as added carbides, or $Cr_3C_2$) is preferably below 1 µm.

In one embodiment, all added chromium carbides, or $Cr_3C_2$, are dissolved in the binder phase, and the sintered cemented carbide is essentially free from undissolved chromium carbides (as added carbides, or $Cr_3C_2$). Preferably, to avoid the presence of such chromium carbides, the Cr/(Ni+Co) ratio should be low enough to guarantee that the maximum content of chromium does not exceed the solubility limit of chromium in the binder phase at 1000° C.

In order to avoid the generation of chromium carbide or graphite in the binder phase, the amount of added carbon should be at a sufficiently low level.

Preferably, the sintered cemented carbide is free from any graphite and is also free from any n-phase.

According to yet another embodiment, $M_7C_3$ is present in the cemented carbide. In this case M is a combination of Cr, Ni, Co (if present) and W, i.e., $(Cr,Ni,Co,W)_7C_3$. The exact balance of Cr:Ni:Co:W is determined by the overall carbon content of the cemented carbide. The ratio $Cr/M_7C_3$ (Cr as weight % and $M_7C_3$ as vol %) in the cemented carbide is suitably equal to or above 0.05, or equal to or above 0.1, or equal to or above 0.2, or equal to or above 0.3, or equal to or above 0.4. The ratio $Cr/M_7C_3$ (Cr as weight % and $M_7C_3$ as vol %) in the cemented carbide is suitably equal to or less than 0.5, or equal to or less than 0.4. The content of $M_7C_3$ is defined as vol % since that is how it is practically measured. Expected negative effects in rock drilling by the presence of $M_7C_3$ cannot surprisingly be seen. Such negative effects in rock drilling would have been brittleness of the cemented carbide due to the additional carbide and also reduced toughness due to the lowering of binder phase content when $M_7C_3$ is formed. Thus, the acceptable range for carbon content during production of cemented carbide can be wider since $M_7C_3$ can be accepted. This is a great production advantage.

Rock drill inserts are subjected to intense impacts during use and traditionally a used rock drill insert is considered to be better (tougher) than a new, unused one since deformation hardening and build-up of compressive stresses have taken place at and near the surface of a used insert having been active in rock drilling. The risk of failure of the drill bit is therefore reduced for a used insert when compared with a new one. The present invention provides a rock drill insert which already from the beginning, as a new insert, presents a large difference in hardness between the surface of the rock drill insert and its interior, and the rock drill insert has a surface hardness more similar to a used insert. Therefore, a rock drill insert according to the present invention presents a lower risk of early damage and failure.

Also, the large difference in hardness between the surface of the rock drill insert and its interior is present over the whole surface and will therefore also reduce the risk of other types of failures during handling.

In one embodiment the difference between the hardness at 0.3 mm depth below the surface at some point of the surface of the rock drill insert and the minimum hardness of the bulk of the rock drill insert is at least 50 HV3, or at least 75 HV3, or at least 100 HV3.

In one embodiment the difference between the hardness at 0.3 mm depth below the surface at some point of the rock drill insert and the hardness at 1 mm below the surface is at least 20 HV3, or at least 25 HV3, or at least 30 HV3, or at least 35 HV3.

In one embodiment the difference between the average hardness at 0.3 mm below the surface of the rock drill insert and the average hardness in the bulk of the rock drill insert is at least 20 HV3, or at least 30 HV3, or at least 40 HV3. The average hardness at 0.3 mm depth is defined as the average of at least 50 measured hardness values at the certain depth evenly distributed around the insert.

In one embodiment the difference between the average hardness at 0.3 mm below the surface of the rock drill insert and the average hardness at 1 mm below the surface is at least 15 HV3, or at least 20 HV3, or at least 25 HV3. The average hardness at a certain depth is defined as the average of at least 50 measured hardness values at the certain depth evenly distributed around the insert.

In one embodiment the difference between the hardness at 0.3 mm depth below the surface at any point of the rock drill insert and the minimum hardness of the bulk of the rock drill insert is at least 20 HV3, or at least 30 HV3, or at least 40 HV3.

In one embodiment the difference between the hardness 0.3 mm below the surface at any point of the rock drill insert and the hardness at 1 mm below the surface of the rock drill insert is at least 15 HV3, or at least 20 HV3, or at least 25 HV3.

The binder phase content of the cemented carbide is substantially equal throughout the rock drill insert, i.e., no substantial gradient of binder phase elements (Ni, Co, Cr) is present when going from the surface of the rock drill insert to its interior. A slight difference in binder phase content may, however, appear in an uppermost zone between the surface and down to a depth of 0.2 mm.

The rock drill insert of the invention must not be prone to failure due to brittleness-related problems. Therefore, the cemented carbide of the rock drill insert has suitably a hardness of the bulk of not higher than 1700 HV3, or not higher than 1650 HV3, or not higher than 1600 HV3.

The hardness of a cemented carbide depends on the WC grain size and the binder phase content. The cemented carbide of the rock drill insert has suitably a hardness of the bulk of at least 800 HV3, or at least 900 HV3, or at least 1000 HV3.

According to one embodiment, rock drill inserts according to the invention are mounted in a rock drill bit body of a top-hammer (TH) device or a down-the-hole (DTH) drilling device or a rotary drilling device or a cutting disc device. The rotary drilling device may be an oil and gas rotary cutter device. The invention also relates to a rock drill device, in particular a top-hammer device, or a down-the-hole drilling device, or a rotary drilling device, or a cutting disc device as well as the use of a rock drill insert according to the invention in such a device.

BRIEF DESCRIPTION OF THE DRAWINGS

In FIG. 2-9, the ΔHV3 represents the difference between the hardness (HV3) at a certain position and the average hardness as measured in the bulk.

DETAILED DESCRIPTION

Examples

Example 1, Comparative, Ni-Based Cemented Carbide without Cr

As a first material used a cemented carbide material with 5.6 wt % Ni and balance WC was made according to established cemented carbide processes. Powders of WC, Ni and W were milled in a ball mill together with cemented carbide milling bodies. The WC powder grain size measured as FSSS was before milling between 5 and 8 µm. The milling was carried out in wet conditions, using 92% ethanol, with an addition of 2 wt % polyethylene glycol (PEG 8000) as organic binder. After milling, the slurry was spray-dried in $N_2$-atmosphere. Green bodies of a desired shape were produced by uniaxial pressing and sintered by using Sinter-HIP in 55 bar Argon-pressure at 1500° C. for 1 hour.

This material is denoted Sample 1.

Example 2, Invention, Ni-Based Cemented Carbide with Cr

As a second material used a cemented carbide material with 4.9 wt % Ni, 0.5 wt % Cr and balance WC was made according to established cemented carbide processes. Powders of WC, Ni, $Cr_3C_2$ and W were milled in a ball mill. The WC powder grain size measured as FSSS was before milling between 5 and 8 µm. The milling was carried out in wet conditions, using ethanol, with an addition of 2 wt % polyethylene glycol (PEG 8000) as organic binder (pressing agent) and cemented carbide milling bodies. After milling, the slurry was spray-dried in $N_2$-atmosphere. Green bodies of a desired shape were produced by uniaxial pressing and sintered by using Sinter-HIP in 55 bar Ar-pressure at 1500° C. for 1 hour.

This material is denoted Sample 2.

Details on the sintered material are given in Table 1.

TABLE 1

Details on materials produced according to examples 1-2.

|  | Reference Sample 1 | Cr-grade Sample 2 |
|---|---|---|
| Ni (wt %) | 5.6 | 4.9 |
| Cr (wt %) | — | 0.5 |
| C (wt %) | 5.7 | 5.7 |
| W (wt %) | 88.7 | 88.9 |
| Vol % binder (fcc)** | 10.8 | 10.8 |
| Density (g/cm3) | 15.10 | 15.00 |
| HV20* | 1282 | 1392 |

*Vickers indentations using 20 kg load
**Calculated with Thermo-Calc software and TCFE7 database WC Grain Sizes of Sintered Samples of Examples 1-2

The mean WC grain sizes of the sintered materials (Sample 1 and Sample 2) according to Examples 1-2 were determined from SEM micrographs showing representative cross sections of the materials. The final step of the sample preparation was carried out by polishing with 1 µm diamond paste on a soft cloth, followed by etching with Murakami solution. SEM micrographs were obtained using the back-scatter electron detector (BSE), at 15 kV acceleration voltage and a working distance of 10 mm. The magnifications used were 3000× for the materials Sample 1 and 4000× Sample 2.

The mean WC grain size was evaluated using the Jeffries method described below, from at least two different micrographs for each material. An average value was then calculated from the mean grain size values obtained from the individual micrographs (for each material respectively). The procedure for the mean grain size evaluation using a modified Jeffries method was the following:

A rectangular frame of suitable size was selected within the SEM micrograph so as to contain a minimum of 300 WC grains. The grains inside the frame and those intersected by the frame are manually counted, and the mean grain size is obtained from equations (1-3):

$$M = \frac{L_{scale\ mm} \times 10^{-3}}{L_{scale\ micro} \times 10^{-6}} \quad (1)$$

$$vol\ \%\ WC = 100 \times \left(-1.308823529 \times \frac{\left(\frac{wt\ \%\ Co}{100} - 1\right)}{\left(\frac{wt\ \%\ Co}{100} + 1.308823529\right)}\right) \quad (2)$$

$$d = \frac{1500}{M} \times \sqrt{\frac{L_1 \times L_2 \times vol\ \%\ WC}{\left(n_1 + \frac{n_2}{2}\right) \times 100}} \quad (3)$$

Where:
d=mean WC grain size (μm)
$L_1$, $L_2$=length of sides of the frame (mm)
M=magnification
$L_{scale\ mm}$=measured length of scale bar on micrograph in mm
$L_{scale\ micro}$=actual length of scale bar with respect to magnification (μm)
$n_1$=no. grains fully within the frame
$n_2$=no. grains intersected by frame boundary
wt % Co=known cobalt content in weight %.

Equation (2) is used to estimate the WC fraction based on the known Co content in the material. Equation (3) then yields the mean WC grain size from the ratio of the total WC area in the frame to the number of grains contained in it. Equation (3) also contains a correction factor compensating for the fact that in a random 2 D section, not all grains will be sectioned through their maximum diameter.

Table 2 shows the mean WC grain size values obtained for the materials according to Examples 1-2 (Sample 1 and Sample 2) with the above described procedure.

TABLE 2

| Sample material | Mean WC grain size (μm) (modified Jeffries method) |
|---|---|
| Sample 1 (According to Example 1) | 2.6 |
| Sample 2 (According to Example 2) | 1.8 |

Example 3, Drill Bit Inserts and Their Treatment

Drill bit inserts were made of a material according to the description in Examples 1 and 2 respectively. The inserts had a size of 10.0 mm in outer diameter (OD) and 16.6 mm in height with a weight of approximately 16.6 g each and having a spherical dome ("cutting edge"). The inserts were ground on the negative part but leaving the dome and bottom part in an as-sintered condition. Some of the inserts were treated using a method that can best be described as a high energy oscillating collision method, hereafter referred to as the E-method. The equipment used is a commercially available paint shaker of trade mark Corob™ Simple Shake 90 with a maximum load of 40 kg and a maximum shaking frequency of 65 Hz. The E-method is based on a rapid oscillating movement of a closed container filled with inserts or a combination of inserts and tumbling media, wherein the container is repeatedly subjected to acceleration peaks typically up to 8.8 g at the shaking frequency of 45 Hz, where g=9.81 m/s². The oscillating movement occurs primarily along the z-axis, i.e. the vertical axis, with an amplitude of several cm, and simultaneous movement of lesser intensity along the y-axis in the horizontal plane. The inserts are set in motion by means of impacts with the walls of the moving container and subsequent impacts with other inserts and tumbling media. The high frequency of the velocity vector reversal (i.e. frequent abrupt changes in the direction of motion) results in a large number of high-energy insert collisions per unit of time. This characteristic property of the E-method makes it possible to obtain the desired effect in the treated inserts already after very short treatment times.

The program used for the E-method insert treatments corresponded to a shaking frequency of 45 Hz. 5-20 rock drill inserts were placed in hard and thermostable plastic container with double lids and dimensions of 133 mm in height and 122 mm in diameter, together with 4.5 kg media (hard metal pellets with a spherical top and bottom and a negative part in between; total height=6.95 mm, the height of the negative part being 3.22 mm and the diameter of the negative part=6.67 mm, of Sandvik grade H10F and with a weight of each pellet about 3 g) and 1-2 dl cold water for cooling. The filling height in the containers was about ½ and should not exceed ¾. One to four containers were clamped automatically and the shaking was then started. The frequency used was 45 Hz and the shaking time was 27 min for some inserts and 60 min for some inserts. To prevent the containers from excessive heating and melting, cooling of the containers had to be performed after 9 min during the treatment.

The E-treatment has been shown to significantly increase the resistance towards earlier failure due to high impact forces but also, since the effect of the treatment is present all around the drill bit insert, it will also prevent other types of insert failures during handling. The method also gives a significant increase of the hardness (HV3) all over of the surface and a few mm inwards of the insert compared to the bulk hardness (=initial sintered hardness).

Example 4, Drill Bit Inserts and Their Treatment

Further drill bit inserts were made according to the description in Examples 1 and 2 respectively. The inserts had a size of 7.3 mm in outer diameter (OD) and 9.8 mm in height with a weight of approximately 4.8 g each and having a spherical dome ("cutting edge"). The inserts were ground on the negative part but leaving the dome and bottom part in an as-sintered condition. Some of the inserts were treated using The "E-method" as described in Example 3, except for that the shaking time was 9 minutes.

Example 5, Hardness Measurements

The hardening induced by the high energy surface treatment can be characterized by means of performing Vickers hardness mapping. The inserts are sectioned along the longitudinal axis and polished using standard procedures. Vickers indentations at 3 kg load are then systematically distributed over the polished section. For a more detailed description of the applied method, see below:

The hardness measurements were performed using a programmable hardness tester, KB30S by KB Prüftechnik GmbH calibrated against HV3 test blocks issued by Euro Products Calibration Laboratory, UK. Hardness is measured according to ISO EN6507. HV3 means 3 kg load, HV5 means 5 kg load, etc.

The HV3 measurements were done in the following way:
Scanning the edge of the sample.
Programming the hardness tester to make indentations at defined distances to the edge.
Programming the distances between the indentations to 0.3 mm or more.
Indentation with 3 kg load at all programmed coordinates.
Computer moves stage to each coordinate with indentation and runs auto adjust light, auto focus and then auto measure the size of each indentation.
User inspects all photos of the indentations for focus and other matters that disturb the result.

Actual distance could be found out in the figures by measuring the distance between the "◇" symbols that mark the actual location of the HV3 indentation in the figure and then correlating with the mm scale given in the X and Y axis.

The reason for using hardness values measured 0.3 mm below the surface is that with the Vickers indentation method used herein it is difficult to measure the hardness at the very surface.

FIG. 2-9 show hardness maps (HV3 maps) of the results of the indentations made for drill bit inserts of Sample 1 and Sample 2 (according to Example 3).

Table 3 shows average hardness values per contour (all HV values measured at a given distance below surface) for Sample 1 and Sample 2 treated according to Example 3.

TABLE 3

| | HV3 average | | | |
|---|---|---|---|---|
| | 0.3 mm | 4.8 mm (bulk) | HV3 (0.3 mm)- HV3 (4.8 mm) | HV3 (0.3 mm)- HV3 (1.2 mm) |
| Sample 1, 27 min E | 1332 | 1296 | 36 | 20 |
| Sample 2, 27 min E | 1443 | 1407 | 36 | 25 |

Example 6, Impact Toughness Testing of Sample 1 and Sample 2

Figure 1:
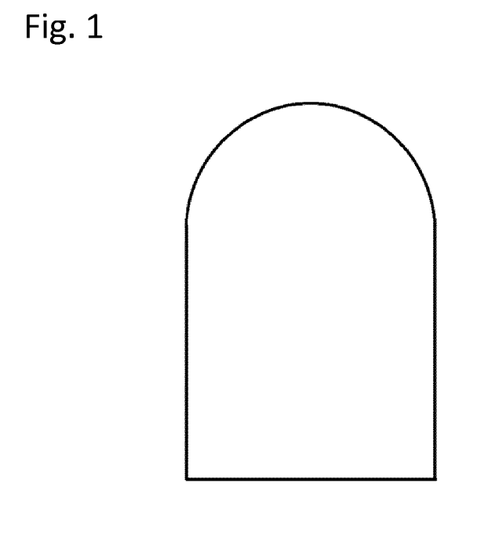
FIG. 1 is a schematic representation of the geometry of a rock drill insert used in testing.
Figure 2:
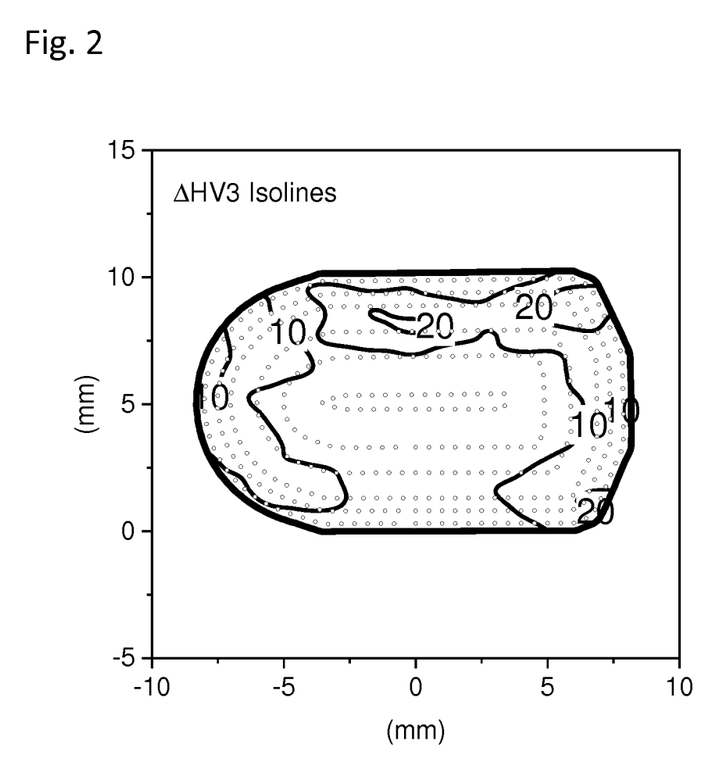
FIG. 2 shows a HV3 map with ΔHV3 isolines of an untreated (=as sintered) rock drill insert where the cemented carbide contains 5.6 wt % nickel but no chromium (Sample 1).
Figure 3:
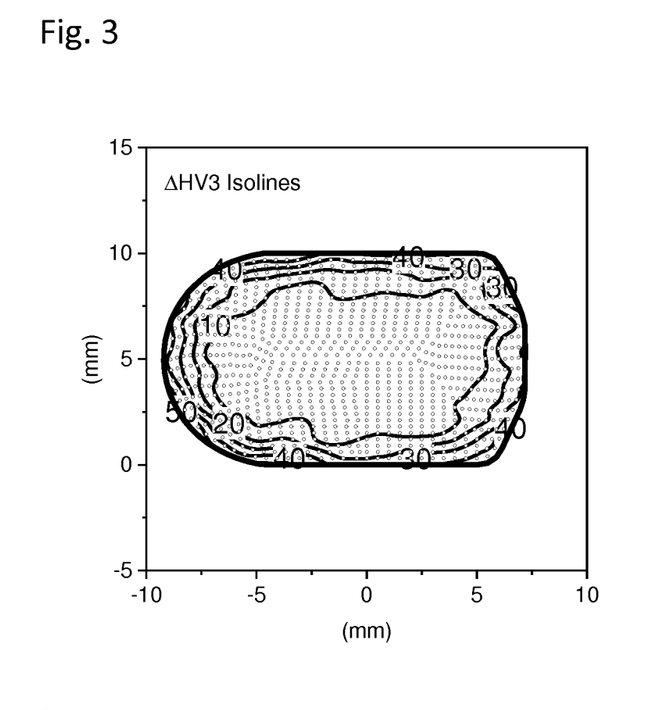
FIG. 3 shows a HV3 map with ΔHV3 isolines of a high-energy oscillation collision treated (27 min) rock drill insert where the cemented carbide contains 5.6 wt % nickel but no chromium (Sample 1).
Figure 4:
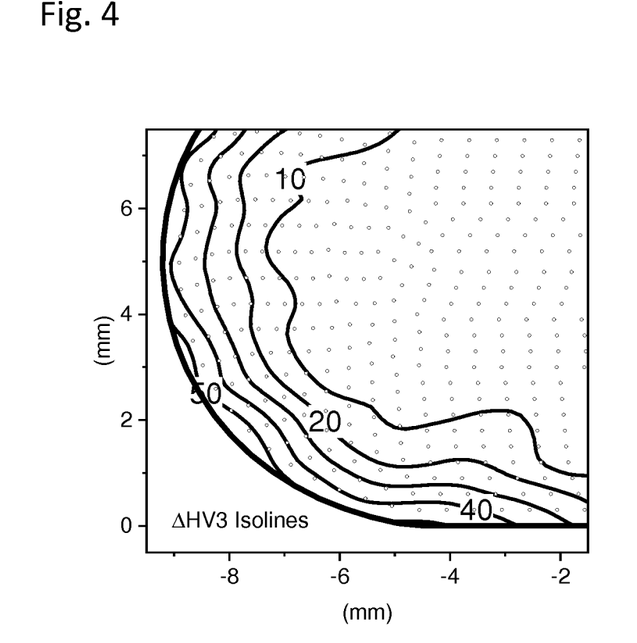
FIG. 4 shows an enlarged HV3 map with ΔHV3 isolines of a part of a high-energy oscillation collision treated (27 min) rock drill insert where the cemented carbide contains 5.6 wt % nickel but no chromium (Sample 1).
Figure 5:
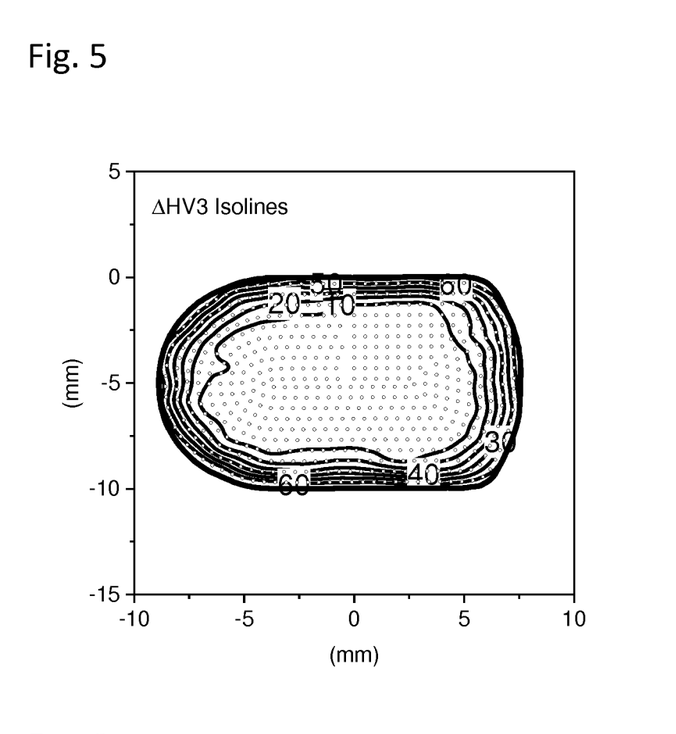
FIG. 5 shows a HV3 map with ΔHV3 isolines of a high-energy oscillation collision treated (60 min) rock drill insert where the cemented carbide contains 5.6 wt % nickel but no chromium (Sample 1).
Figure 6:
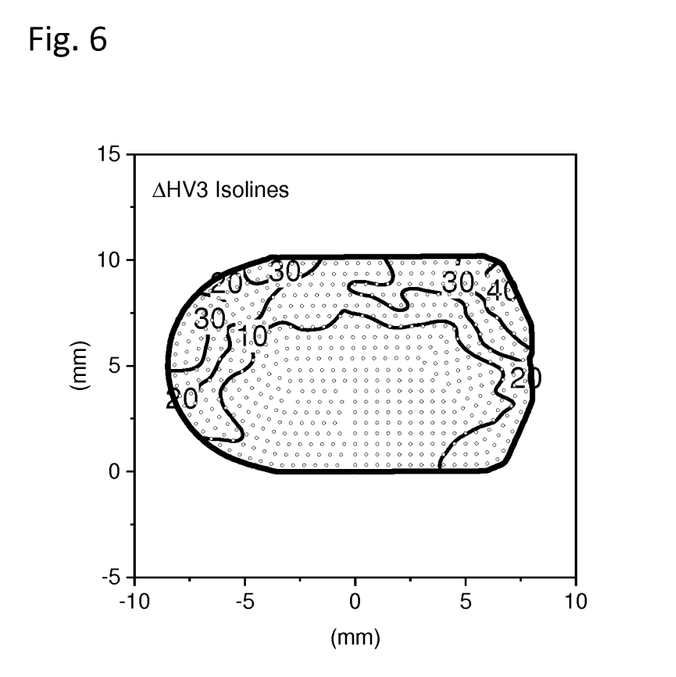
FIG. 6 shows a HV3 map with ΔHV3 isolines of an untreated rock drill insert where the cemented carbide contains 4.9 wt % nickel and 0.5 wt % chromium (Sample 2).
Figure 7:
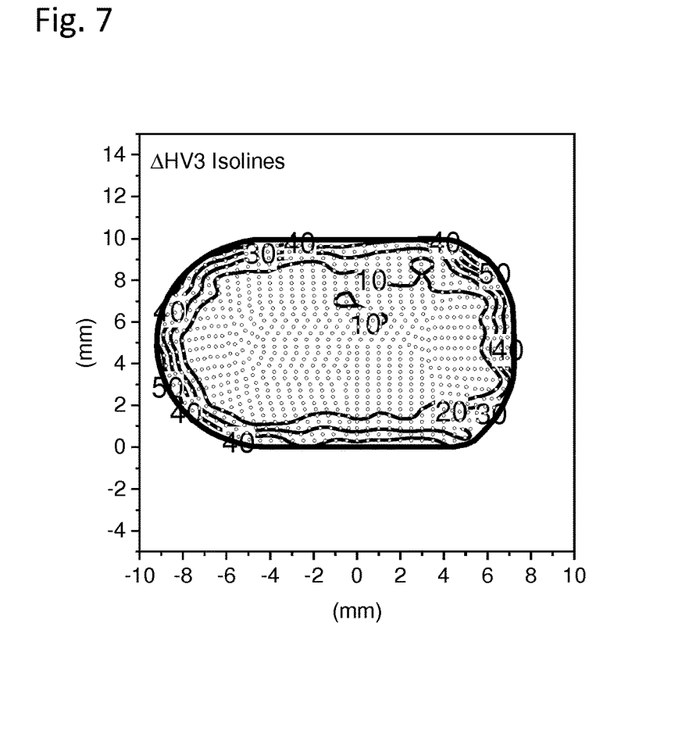
FIG. 7 shows a HV3 map with ΔHV3 isolines of a high-energy oscillation collision treated (27 min) rock drill insert where the cemented carbide contains 4.9 wt % nickel and 0.5 wt % chromium (Sample 2).
Figure 8:
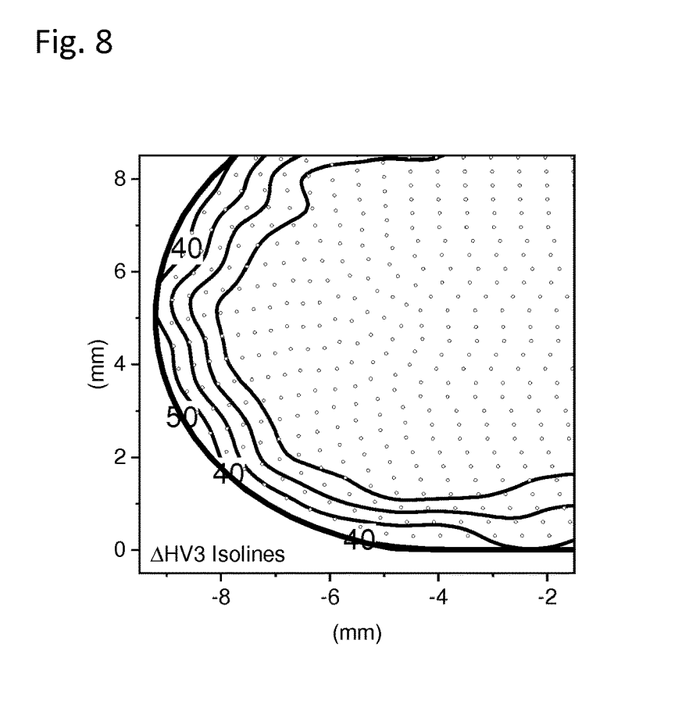
FIG. 8 shows an enlarged HV3 map with ΔHV3 isolines of a part of a high-energy oscillation collision treated (27 min) rock drill insert where the cemented carbide contains 4.9 wt % nickel and 0.5 wt % chromium (Sample 2).
Figure 9:
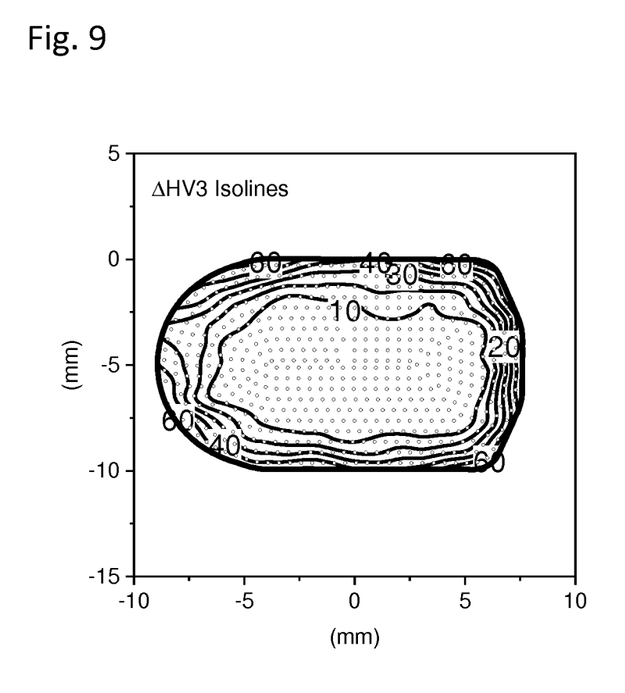
FIG. 9 shows a HV3 map with ΔHV3 isolines of a high-energy oscillation collision treated (60 min) rock drill insert where the cemented carbide contains 4.9 wt % nickel and 0.5 wt % chromium (Sample 2).
Figure 10:
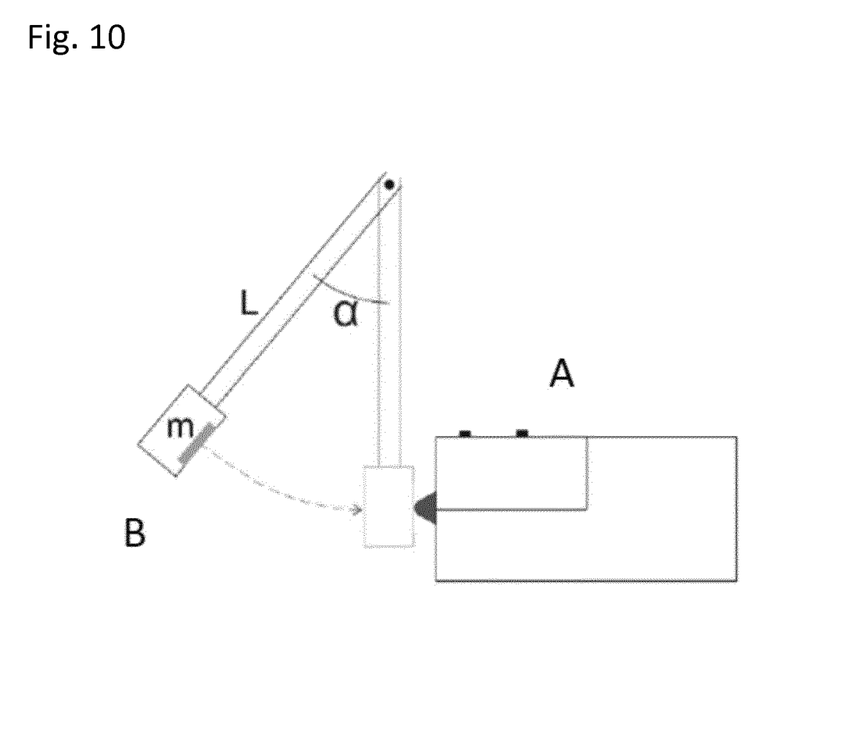
FIG. 10 shows a schematic drawing of a pendulum hammer test set-up (see Example 4).

The impact toughness of drill bit inserts of Sample 1 and Sample 2 (according to Example 3) in an as-sintered state and following E-treatment was tested using a pendulum hammer impact test. A schematic drawing of the pendulum hammer test set-up is shown in FIG. 10. The test procedure used is as follows:

A mining insert made according to Example 3 with a dome shaped tip of 5.0 mm radius and a diameter of 10.0 mm is firmly mounted into a holder (A) with only the dome section protruding. On the pendulum (B) a hard counter surface is mounted, depicted in FIG. 15 as a light grey area on the pendulum hammer head. The counter surface used was a polished SNGN plate (h=5.00 mm, l=19.40 mm, w=19.40 mm) of a hard fine grained hard metal grade having a Vickers hardness (HV30) of approx. 1900.

When the pendulum is released, the counter surface hits the sample tip. If the sample fails, the impact energy absorbed by the sample AE (in Joules) is, for a given initial pendulum angle, calculated using equation 5.

$$AE = (m_{tot} \times g \times L \times (1-\cos(\alpha))) \quad (5)$$

Where m is the total mass of the pendulum hammer 4.22 kg, g is the gravitational constant 9.81 m/s², L is the pendulum hammer length 0.231 m and α is the angle in radians.

To determine the energy needed to fracture the sample, it is first impacted by the pendulum released from a suitable low angle. The angle is then increased step-wise with a 5 degree step until the sample fails. The sample is impacted once at each impact energy level (angle). A visible crack or spalling is considered as sample failure. The first test starting from the low impact energy level is not counted as valid in the evaluation. In the following tests, used in the evaluation, the angle is lowered by 5 degrees from the angle at which failure was first observed, and subsequently increased again with a finer 3 degree step until failure is reached again. The target result is such that each insert fails at the second angle (impact), however, some of the inserts failed only at the third impact. These were also counted as valid results. Inserts which failed on the first impact were not included in the evaluation. In these tests the counter surface was exchanged every 5-10 impacts. The obtained results for Sample 1 and Sample 2 as a function of different surface treatments are presented in tables 4 and 5.

TABLE 4

| Sample 1 (comparative) | | | |
|---|---|---|---|
| Treatment | Absorbed energy at failure (J) | ΔAE (%) | No. of valid tests/samples |
| untreated (OD-ground) | 3.5 | 0 | 3 |
| 27 min E | 12.6 | 261 | 3 |

TABLE 5

| Sample 2 (the invention) | | | |
|---|---|---|---|
| Treatment | Absorbed energy at failure (J) | ΔAE (%) | No. of valid tests/samples |
| untreated (OD-ground) | 3.5 | 0 | 3 |
| 27 min E | 13.8 | 295 | 3 |

In tables 2 and 3: ΔAE in percentage is calculated as:

$$\Delta AE = ((\text{Average } AE \text{ (Treated)} - \text{Average } AE \text{ (OD-ground)})/\text{Average } AE \text{ (OD-ground)}) \times 100$$

where AE is the absorbed energy at fracture.

The results show that the resistance against failure, measured as the energy needed to fracture the sample, increases more (295%) when comparing a chromium-containing insert that has been E-treated with an insert not containing chromium (261%), the reference level being non-treated (OD-ground) samples.

Example 7, Toughness of Sample 1 and Sample 2

The toughness of drill bit inserts of Sample 1 and Sample 2 (made according to Example 4) was characterized using the insert compression test, which is an alternative to the pendulum hammer test used in Example 6.

For each of the materials, Sample 1 and Sample 2, a part of the inserts from the same batch were tested in the as sintered condition, while another part of the inserts were tested following 9 minutes of treatment using the E-method as already described in Example 4.

The insert compression (IC) test method involves compressing a drill bit insert between two plane-parallel hard counter surfaces, at a constant displacement rate, until the failure of the insert. A test fixture based on the ISO 4506: 2017 (E) standard "Hardmetals–Compression test" was used, with cemented carbide anvils of hardness exceeding 2000 HV, while the test method itself was adapted to toughness testing of rock drill inserts. The fixture was fitted onto an Instron 5989 test frame. The loading axis was identical with the axis of rotational symmetry of the inserts.

The counter surfaces of the fixture fulfilled the degree of parallelism required in the ISO 4506:2017 (E) standard, i.e. a maximum deviation of 0.5 µm/mm. This is of great importance for the test alignment and repeatability of the results. The tested inserts were loaded at a constant rate of crosshead displacement equal to 0.6 mm/min until failure, while recording the load-displacement curve. The test rig and test fixture compliance was subtracted from the measured load-displacement curve before test evaluation. Two inserts were tested per material and treatment. The counter surfaces were inspected for damage before each test. Insert failure was defined to take place when the measured load suddenly dropped by at least 1000 N. Subsequent inspection of tested inserts confirmed that this in all cases coincided with the occurrence of a macroscopically visible crack.

The material toughness was characterized by means of the total absorbed deformation energy until fracture, denoted as AEIC. AEIC was calculated for each test as the total area under the measured load-displacement curve until fracture. Table 6 shows the average values of AEIC obtained for the Sample 1 and Sample 2 materials in the as sintered state and after 9 minutes of E-treatment, respectively. ΔAEIC, the average percental increase in absorbed energy following the treatment, is also included in the table. The increase was calculated from the average of the absorbed energy values as:

ΔAEIC=((AEIC treated−AEIC as sintered)/AEIC as sintered)*100

TABLE 6

Absorbed energy in the insert compression test.

| Material | AEIC (as sintered) (J) | AEIC (treated 9 min E-method) (J) | ΔAEIC (%) |
|---|---|---|---|
| Sample 1 | 0.53 | 2.99 | 463 |
| Sample 2 | 0.68 | 4.18 | 511 |

It can be seen from the test results that even the short E-method treatment time of 9 minutes resulted in a dramatic increase of the absorbed energy. The effect of the treatment was clearly more pronounced for the chromium containing Sample 2, with ΔAEIC of 511% as compared to the 463% obtained with the chromium-free Sample 1, despite the equal binder phase volume of the two materials.

Example 8, Abrasion Wear Testing

Drill bit inserts of Sample 1 and Sample 2 according to Example 3 (⌀10 mm OD, spherical front) in an as-sintered state and following E-treatment were tested in an abrasion wear test, wherein the sample tips are worn against a rotating granite log counter surface in a turning operation. The test parameters used were as follows: 200 N load applied to each insert, granite log rpm=280, log circumference ranging from 44 to 45 cm, and a horizontal feed rate of 0.339 mm/rev. The sliding distance in each test was constant at 150 m and the sample was cooled by a continuous flow of water. Each sample was carefully weighed prior to and after the test. Mass loss of one to two samples per material was evaluated after 150 m sliding distance. Sample volume loss for each of the tested materials and different surface treatments, calculated from the measured mass loss and sample density, is presented in table 7.

The abrasion wear test results clearly show significantly increased wear resistance for the material according to the invention (Sample 2), as compared to the reference material (Sample 1). Further improvement in wear resistance was observed for the inserts that had been subjected to the E-method surface treatment for 27 min.

TABLE 7

Results as sample wear measured in the abrasion wear test.

| Sample material | Treatment | Mass loss of each specimen (g) | Density (g/cm$^3$) | Volumetric wear of each specimen (mm$^3$) | Average volumetric wear (mm$^3$) |
|---|---|---|---|---|---|
| Sample 1, comparative | As sintered dome | 0.0078 0.0095 | 15.10 | 0.517 0.629 | 0.573 |
| Sample 1, comparative | 27 min E | 0.0071 0.0071 | 15.10 | 0.470 0.470 | 0.470 |
| Sample 2, invention | As sintered dome | 0.0043 0.0045 | 15.00 | 0.287 0.300 | 0.293 |
| Sample 2, invention | 27 min E | 0.0034 0.0031 | 15.00 | 0.227 0.207 | 0.217 |

The invention claimed is:

1. A rock drill insert made of cemented carbide, the cemented carbide consisting of hard constituents of tungsten carbide (WC) in a binder phase of 3.5-18 wt % of Ni—Cr, or Ni—Co—Cr, and a balance of WC and unavoidable impurities, the binder phase having >0.25 wt % Ni, wherein a mass ratio of Cr/(Ni+Co) is 0.02-0.19, and wherein a difference between a hardness at 0.3 mm depth at any point of a surface of the rock drill insert and a minimum hardness of a bulk of the rock drill insert is at least 30 HV3, wherein the cemented carbide has a hardness of not higher than 1700 HV3, wherein there is no substantial gradient of binder phase elements Ni, Co or Cr present when going from the surface of the rock drill insert to its interior, and wherein after sintering the cemented carbide is essentially free from undissolved chromium carbides.

2. The rock drill insert according to claim 1, wherein the difference between the hardness at 0.3 mm depth below the surface at any point of the rock drill insert and a hardness at 1 mm below the surface is at least 20 HV3.

3. The rock drill insert according to claim 1, wherein the difference between an average hardness at 0.3 mm below the surface at any point of the rock drill insert and an average hardness in the bulk of the rock drill insert is at least 20 HV3.

4. The rock drill insert according to claim 1, wherein the difference between an average hardness at 0.3 mm below the surface at any point of the rock drill insert and an average hardness at 1 mm below the surface is at least 15 HV3.

5. The rock drill insert according to claim 1, wherein the difference between the hardness at 0.3 mm depth below the surface at any point of the rock drill insert and the minimum hardness of the bulk of the rock drill insert is at least 20 HV3.

6. The rock drill insert according to claim 1, wherein the difference between the hardness 0.3 mm below the surface at any point of the rock drill insert and a hardness at 1 mm below the surface of the rock drill insert is at least 15 HV3.

7. The rock drill insert according to claim 1, wherein a WC grain size mean value of the cemented carbide is above 1 μm but less than 18 μm.

8. The rock drill insert according to claim 1, wherein the cemented carbide includes 4-12 wt % binder phase.

9. The rock drill insert according to claim 1, wherein the binder phase of Ni—Co—Cr has >50 wt % Ni.

10. The rock drill insert according to claim 1, wherein the binder phase is a binder phase of Ni—Cr.

11. The rock drill insert according to claim 1, wherein the mass ratio of Cr/(Ni+Co) in the cemented carbide is 0.04-0.19.

12. The rock drill insert according to claim 1, wherein the mass ratio of Cr/(Ni+Co) in the cemented carbide is 0.085-0.15.

13. A rock drill bit body comprising one or more mounted rock drill inserts according to claim 1.

\* \* \* \* \*